(12) United States Patent
Ryzi et al.

(10) Patent No.: US 7,435,979 B2
(45) Date of Patent: *Oct. 14, 2008

(54) OPTICAL DEVICE AND METHOD OF MANUFACTURE

(75) Inventors: Zbynek Ryzi, Rez u Prahy (CZ);
Kenneth John Drinkwater, Andover (GB); Frantisek Matejka, Brno (CZ)

(73) Assignee: Optaglio Ltd., Swinden (GB)

( * ) Notice: Subject to any disclaimer, the term of this patent is extended or adjusted under 35 U.S.C. 154(b) by 63 days.

This patent is subject to a terminal disclaimer.

(21) Appl. No.: 11/505,526

(22) Filed: Aug. 16, 2006

(65) Prior Publication Data

US 2007/0284546 A1    Dec. 13, 2007

Related U.S. Application Data

(63) Continuation of application No. 10/483,840, filed as application No. PCT/GB02/03257 on Jul. 16, 2002, now Pat. No. 7,358,513.

(30) Foreign Application Priority Data

Jul. 17, 2001  (GB) .................. 0117391.3

(51) Int. Cl.
*G21K 5/10* (2006.01)
*H01J 37/08* (2006.01)

(52) U.S. Cl. .................. 250/492.22; 250/492.3; 359/850; 359/2; 359/569; 359/619; 430/321; 283/85; 426/410

(58) Field of Classification Search .......... 250/492.2; 359/850, 2, 569, 619; 430/321; 283/85; 428/410

See application file for complete search history.

(56) References Cited

U.S. PATENT DOCUMENTS

| 4,544,266 A | 10/1985 | Antes |
| 4,761,252 A | 8/1988 | Siegel et al. |
| 5,034,003 A | 7/1991 | Denance |
| 5,101,184 A | 3/1992 | Antes |
| 5,335,113 A | 8/1994 | Jackson et al. |
| 5,483,363 A | 1/1996 | Holmes et al. |
| 5,668,047 A | 9/1997 | Muroya |
| 5,694,229 A | 12/1997 | Drinkwater et al. |
| 5,825,475 A | 10/1998 | Formose |
| 5,912,767 A | 6/1999 | Lee |
| 7,358,513 B2 * | 4/2008 | Ryzi et al. ............. 250/492.3 |

(Continued)

FOREIGN PATENT DOCUMENTS

DE    3840037    5/1990

(Continued)

*Primary Examiner*—Jack I. Berman
*Assistant Examiner*—Meenakshi S Sahu
(74) *Attorney, Agent, or Firm*—Townsend and Townsend and Crew LLP

(57) ABSTRACT

The present invention provides for a method of producing an optical device by means of electron beam lithography and including the step of varying the characteristics of the electron beam spot during formation of the device and also an apparatus for producing diffractive optical devices and/or holographic devices by means of electron beam lithography and including an electron beam lithograph, controlling and processing means, means for varying the characteristics of the electron beam spot during formation of the device, and wherein the processing means is arranged for compiling and pre-processing data and for providing optimization and allocation control and to optical devices such as those produced thereby.

16 Claims, 15 Drawing Sheets

U.S. PATENT DOCUMENTS

| | | |
|---|---|---|
| 2002/0170497 A1 | 11/2002 | Smirnov et al. |
| 2005/0052745 A1 | 3/2005 | Lee |

FOREIGN PATENT DOCUMENTS

| | | |
|---|---|---|
| RU | 2164718 C1 | 3/2001 |
| SU | 1677734 A1 | 9/1991 |
| WO | WO 91/03747 | 3/1991 |
| WO | WO93/18419 | 9/1993 |
| WO | WO 94/28444 | 12/1994 |
| WO | WO95/02200 | 1/1995 |
| WO | WO95/04948 | 2/1995 |
| WO | WO98/23979 | 6/1998 |
| WO | WO99/17941 | 4/1999 |
| WO | WO99/59036 | 11/1999 |
| WO | WO00/02067 | 1/2000 |

* cited by examiner

Figure 1 Two level data input
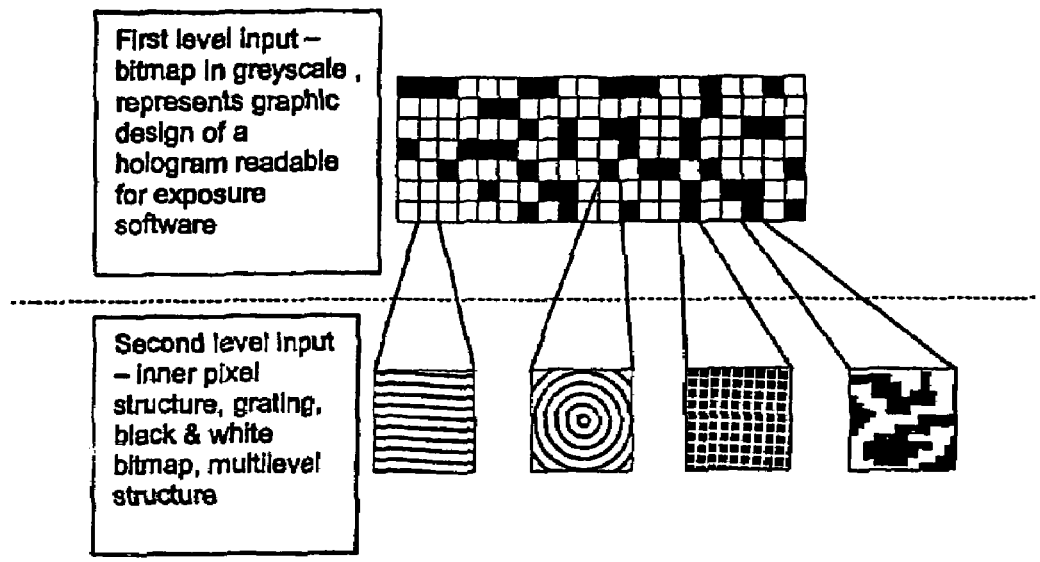
Figure. 2 Blank area at the boundaries of pixels
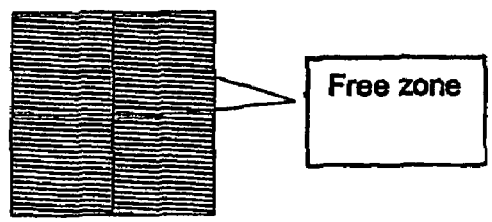
Figure 3 Pixel gratings with continuous and non-continuous lines – discontinuitity effects
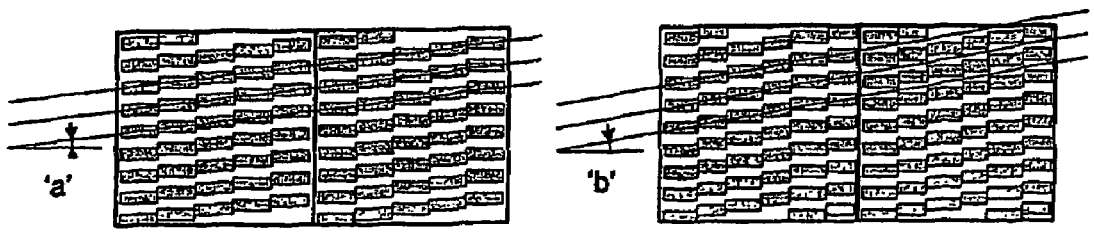

Figure 4  Variable Electron beam spot
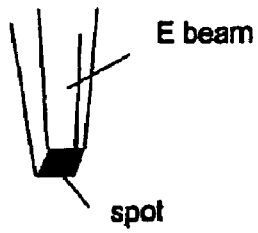
Figure 5  Filling of arbitrary areas of microstructure
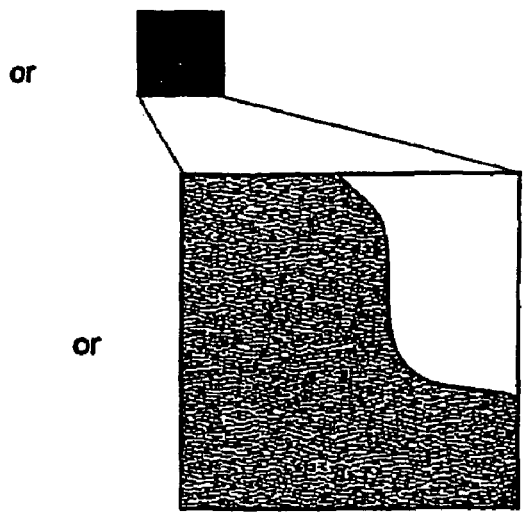
Figure 6A  Minimum and maximum e-beam spot size for optimisation calculation
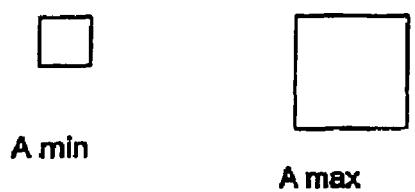
A min   A max
Figure 6B  Maximum ratio between spot sizes in both coordinates
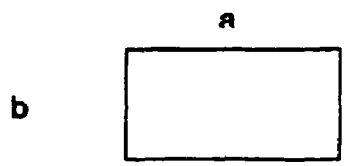

Figure 6C : Define and limit the allowable change in spot size for example to be only in multiples of minimum spot size as in Figure 6C.

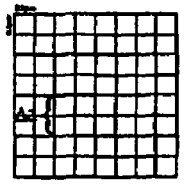

Figure 7 Rules by which edge exposure areas are calculated

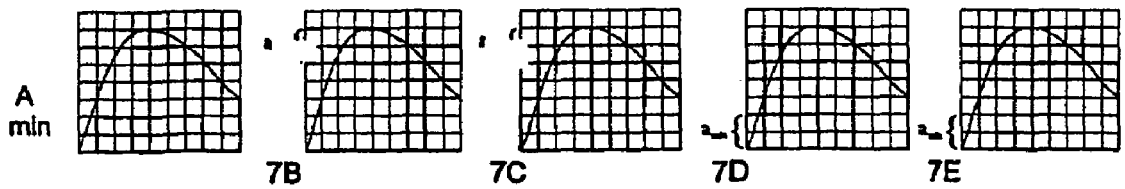

Figure 8 The filling level of exposure near the border which can be one of several types as shown in Figure 8:

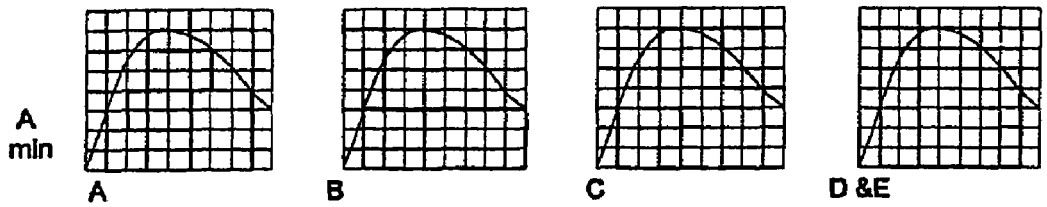

Figure 9 Exact – the structure is exposed up to the border with an accuracy of 0.1micron

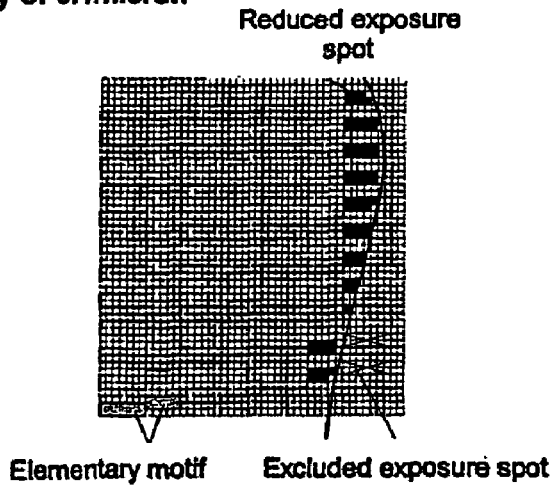

Figure 10. With tolerance of minimum spot size used
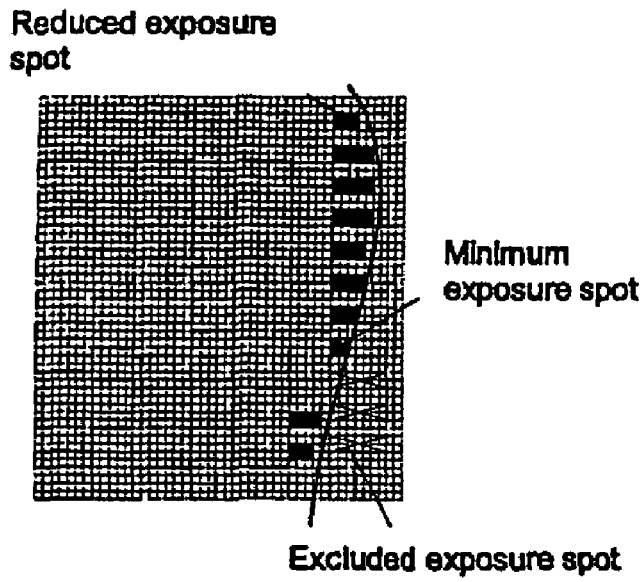
Figure 11. With tolerance of one exposure spot – the structure is exposed up to the border with the tolerance of the exposure spot exceeding the border
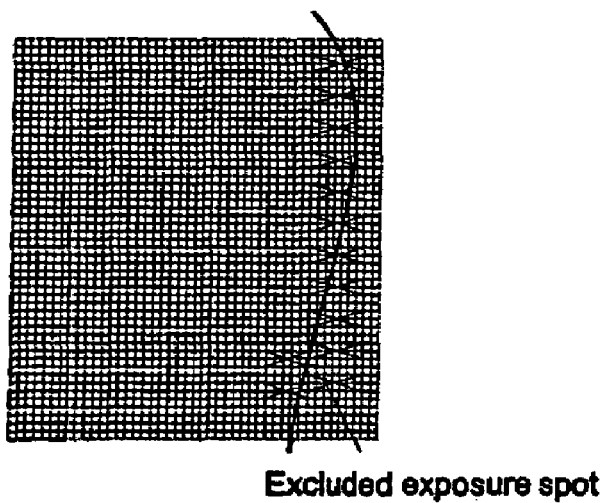

Various possible structures in Zone X – typical size x25-500μm.
Y scale size c. 10-200μm in one dimension.

FIGURE 13 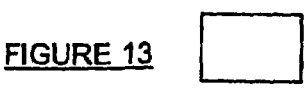 Examples of sub area subdivision patterns.

 Diffractive structure Image A.   ▬ Diffractive structure Image B.

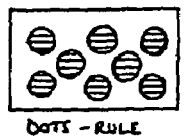
DOTS - RULE

RECTANGLES/ELLIPSES
- RULE

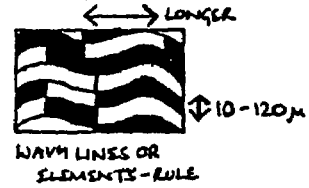
WAVY LINES OR
ELEMENTS - RULE

FIGURE 14

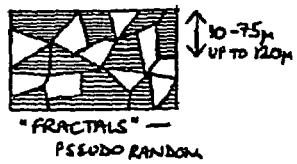
"FRACTALS" —
PSEUDO RANDOM

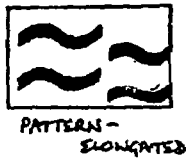
PATTERN -
ELONGATED

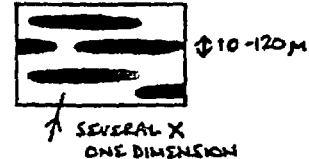
SEVERAL X
ONE DIMENSION

FIGURE 15A a) Diffraction gratings
-spot output
(plus dispersion).

b) Short rainbow
slits replay.

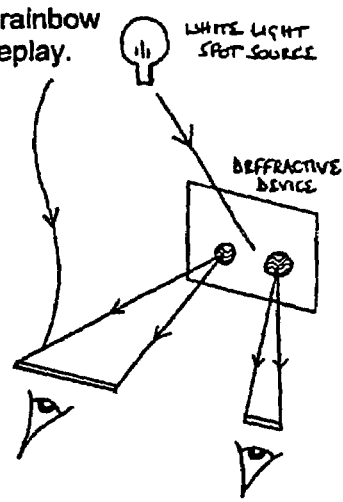

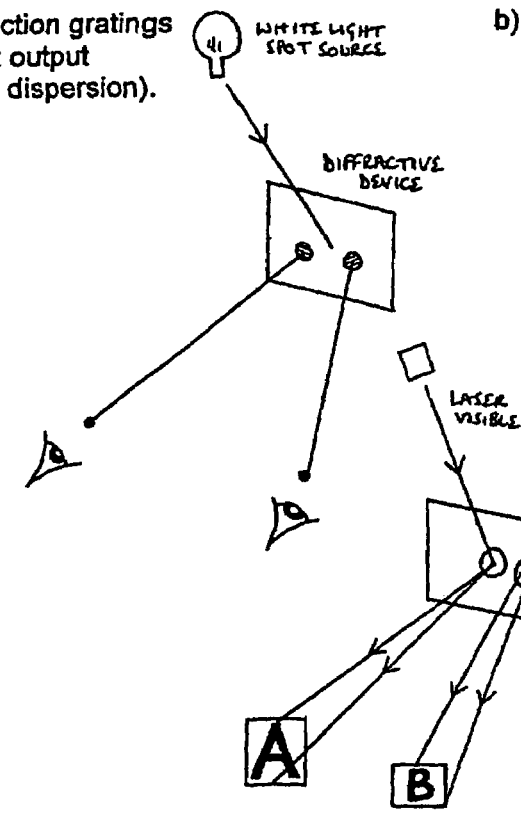

c) Fourier hologram —
laser viewable out of
plane image.

FIGURE 15B
Forms of optical microstructure at the submicron level:
a) Diffraction gratings (plane lines). 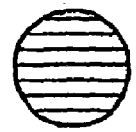
b) Elements of short rainbow holograms
 (Additional substructure but apparently plane lines). 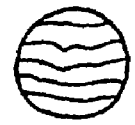
c) Fourier hologram can be interferometric style as (b) 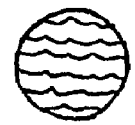
 a binary (computer calculated). 
FIGURE 16A
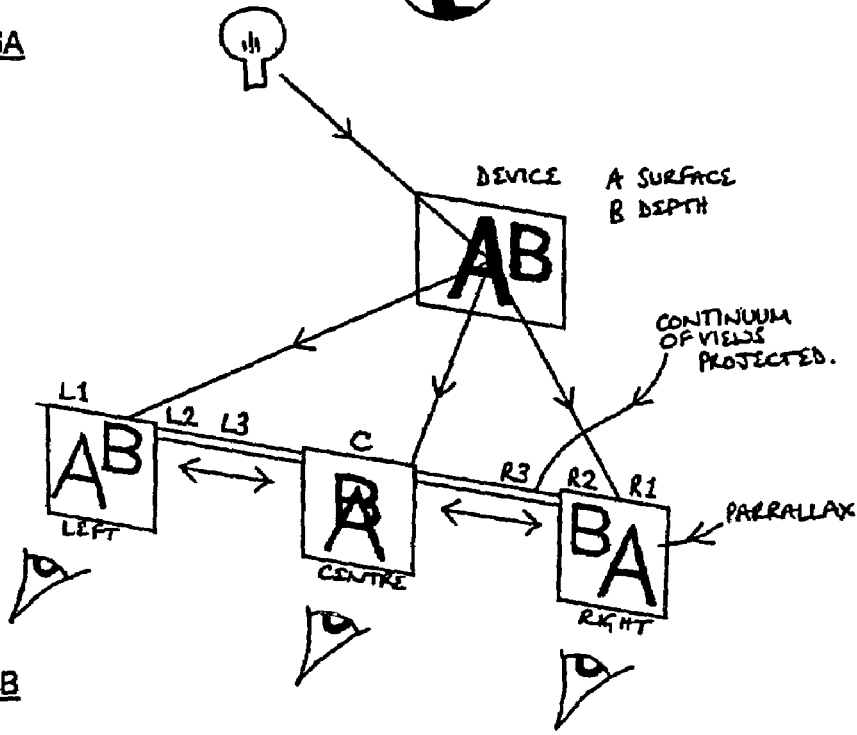
FIGURE 16B
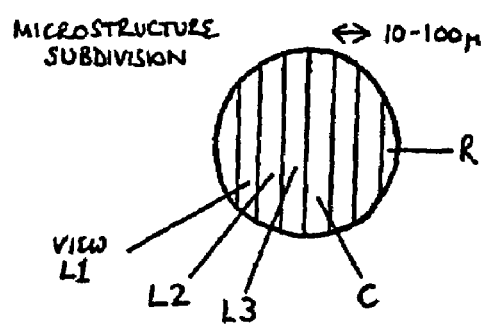

An example of elemental subdivision.

Areas of subdivision adjusted to compensate for parallax v. brightness.

Device uses method of device 3A to replay 2 three-dimensional images visible On 90 degrees rotation.

FIGURE 17B - continued
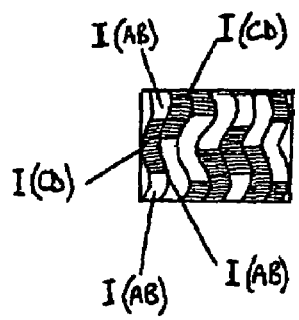
Substructure split between two 90° views and further subdivided.
FIGURE 18
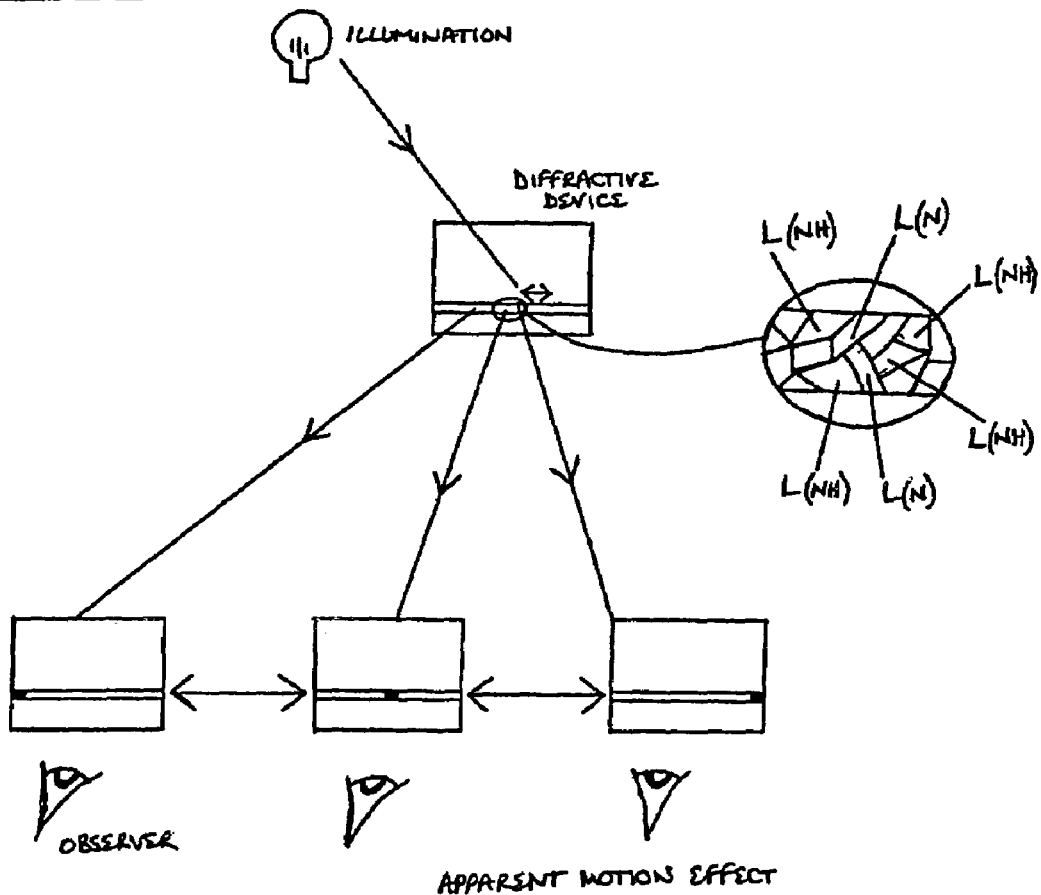

Device 4A

FIGURE 20
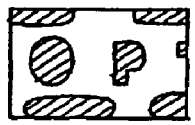
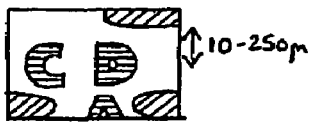
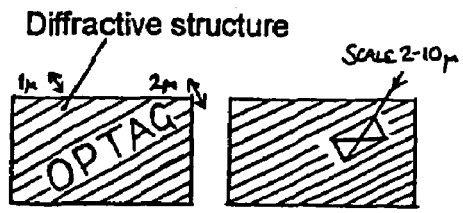
Microwriting enclosing areas of discrete diffractive structure - size 10μm-250μm.
Microwriting as part of a real subdivision.
Microwriting in grating area - size 2-10μm.
"Nanowriting" in diffractive structure (also as shapes).
FIGURE 21A
Device
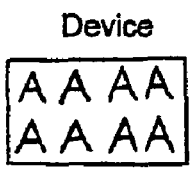
Regular array small graphics – scale too small to see (10-250μm)
Authenticate via overlay.
Lens array – Scale 10-250μm.
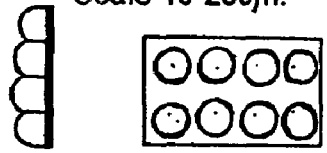
Pitch near match for graphics.
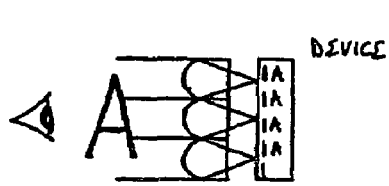
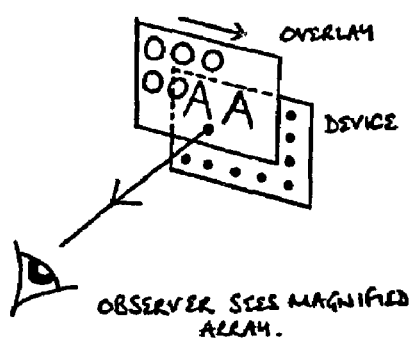

Authentication lens array consists of diffractive fresnel zone plane.

Uniform pattern of pixels, dots and lines with structure – designed to be authenticated by film overlay – pattern encoded by small shifts of dot position to give more effect with overlay.

FIGURE 21C – continued
Alternative encoding method by line splitting – keep average density the same – split lines – authenticate with lenticular lens at diffraction grating to separate two views.
Enlargement:
(Line splitting technique)
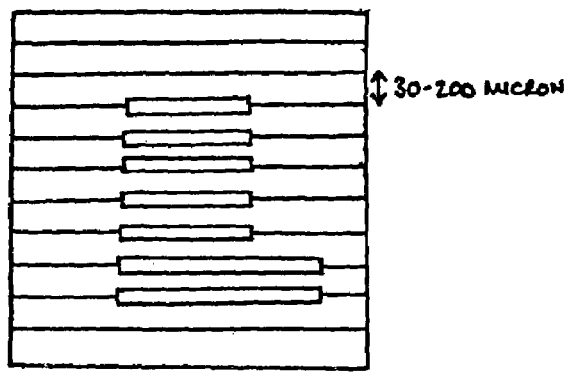
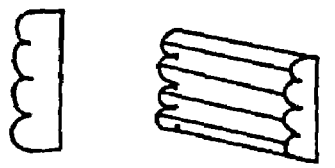
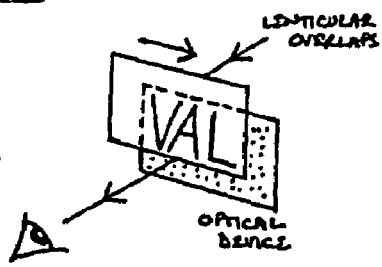
Lenticular 2D lens or
Coarse diffraction grating
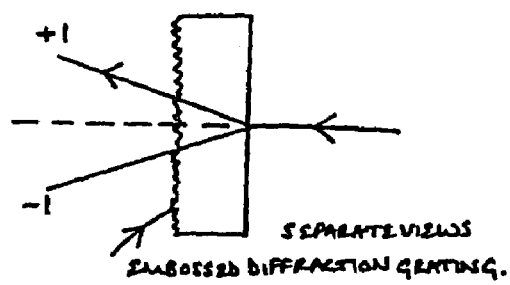
Embossed diffraction grating.

FIGURE 22
Scattering elements
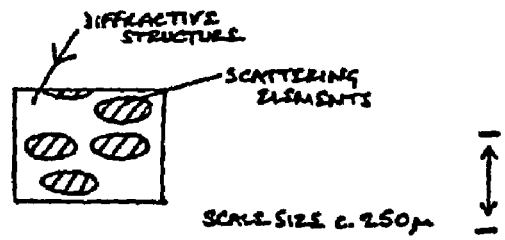
Form of scattering microstructure – random topography to scatter – not diffractive.
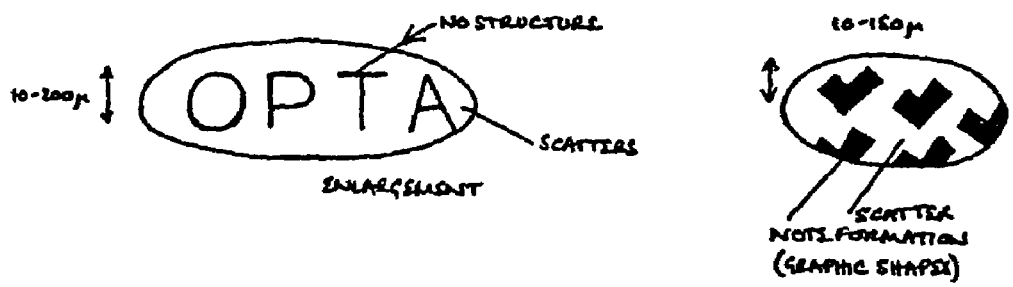
Cross section containing information – graphics – microwriting.
FIGURE 23
Enlargement
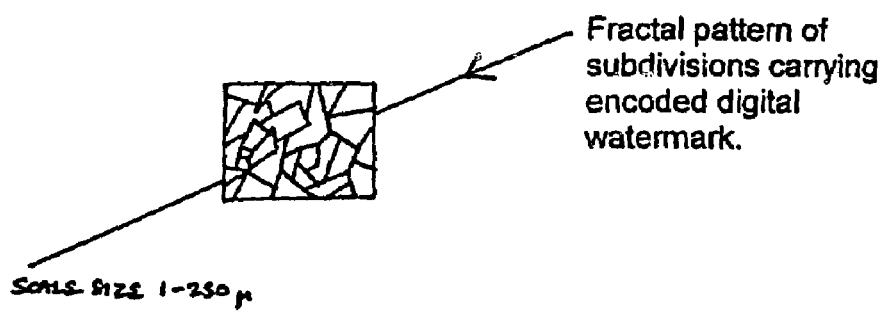
Fractal pattern of subdivisions carrying encoded digital watermark.

FIGURE 24
A. Diffractive lenser.
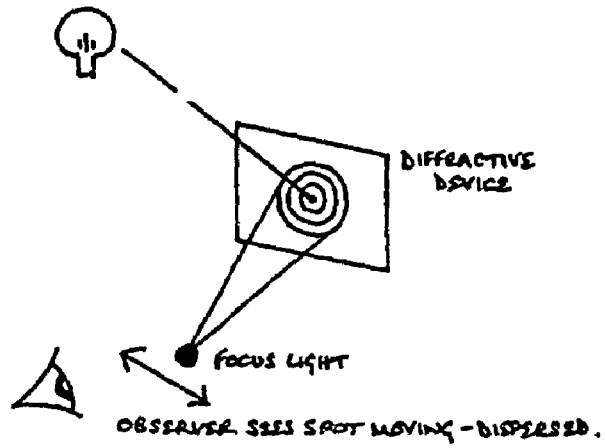
OBSERVER SEES SPOT MOVING - DISPERSED.
B. Array of diffractive lenses.
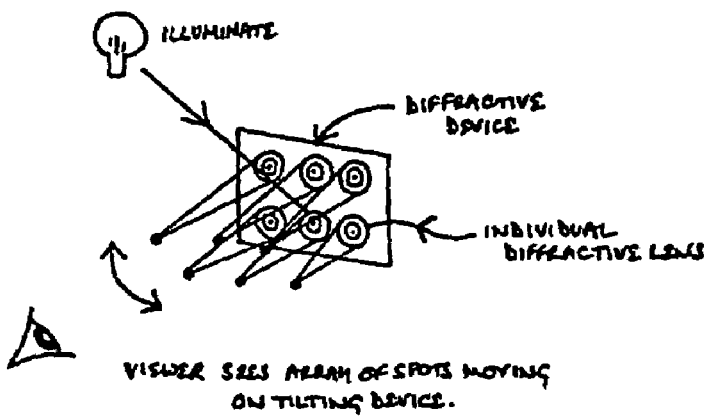
VIEWER SEES ARRAY OF SPOTS MOVING ON TILTING DEVICE.
C. Array of diffractive lenses – forming focussed images – images visible under filtered lights.
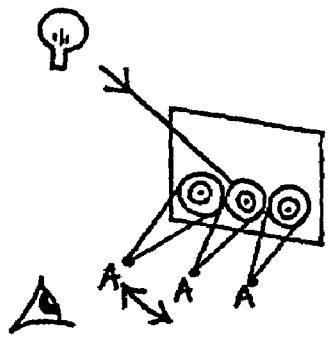

OPTICAL DEVICE AND METHOD OF MANUFACTURE

This application is a continuation application and claims the benefit of U.S. patent application Ser. No. 10/483,840, filed Jul. 16, 2004, now U.S. Pat. No. 7,358,513 entitled "OPTICAL DEVICE AND METHOD OF MANUFACTURE", which in turn claims the benefit of PCT/GB02/03257, filed Jul. 16, 2002, which in turn claims priority to application UK 0117391.3, filed Jul. 17, 2001, the complete disclosures of which are incorporated herein by reference.

BACKGROUND OF THE INVENTION

This invention relates to optical devices and related methods of manufacture and verification. In particular, but not exclusively, the invention relates to security anti-counterfeit devices employing the principle of optical diffraction, and to an improved form of optical security device for use in the protection of documents and articles of value from counterfeit and to verify authenticity.

Several forms of such devices are known and used to prove the authenticity of items of value and to prevent their fraudulent duplication. Examples of such items are banknotes, plastic cards, value documents such as fiscal stamps, travel documents such as passports and also valuable goods per se.

Devices based on the principle of optical diffraction have found use for such purposes since they can produce, by the process of optical diffraction, an optically variable image with characteristic features such as depth and parallax (holograms) and movement features and image switches (purely diffraction grating devices and some holographic devices). Such diffractive, optically variable image forming devices are used as anti-counterfeit devices both because their effects are highly recognizable and cannot be duplicated by print technologies, and because specific, and difficult-to-replicate, optical and engineering techniques are required for their production.

Such diffractive, optically variable image-forming devices are generally manufactured to produce effects based on holographic or pure diffraction grating techniques and often comprise embossed surface relief structures as those known disclosed in Practical Holography, Graham Saxby, Prentice Hall 1988. These device structures are typically applied to documents of value, plastic cards and articles of value to be protected in the form of holographic or diffractive hot stamping foil or holographic or diffractive labeling, often tamper evident.

There are various forms of pure diffraction grating devices already known and in use as such security devices. One example is disclosed in U.S. Pat. No. 4,568,141, which describes a diffraction optical authenticating element that provides a color pattern moving at a predetermined velocity along a predetermined track when the document is illuminated from a first direction, and viewed from a second direction. The device described consists of a plane diffraction grating structure which defines a predetermined track in which at least one of the spatial frequency, or angular orientation, varies along said track such that when the device is illuminated and rotated in a plane, adjacent regions of the diffraction grating structure successively diffract light to cause a viewer to see a color pattern which appears to move along the movement track. Each element of this device comprises a pure plane diffraction grating and does not form an image outside of the plane of the device.

A manufacturing method for such a security diffraction grating master is disclosed in U.S. Pat. No. 4,761,252 and employs a technique using a punch to impress successive small areas of a flexible embossing die into a sheet of thermoplastic material.

Further, U.S. Pat. No. 5,034,003 discloses another form of optical security device using diffraction gratings to produce a switching image by recording in the device sets of pixels with each pixel consisting of small areas of different grating spatial frequencies and orientations and serving to form a diffracted image visible from different directions. In this device a diffractive device switches between two replayed images created by splitting the device into several sets of interlocking pixels, with each pixel divided into sub pixels of plane diffraction gratings with different sub pixels corresponding to different replay directions. This device only forms images located on the image plane of the device. There is no provision for additional functionality within the image such as enhanced view angle or depth effects to provide parallax effects.

Another known method of producing a pure diffraction grating security device is to write directly the diffractive structure by use of electron beam lithography, such as those known in the art as Catpix, Pixelgram, and Exelgram. Some examples of this are WO-A-9103747, WO-A-9428444, WO-A-9318419, WO-A-9504948 and WO-A-9502200, WO-A-9823979 and WO-A-002067 describing electron beam generated diffractive optical security devices.

WO-A-9103737 describes a method of subdividing an optically invariant image into a set of pixels which are mapped to diffraction spatial frequencies where a greyness factor for each pixel determines the extent of curvature of the grating lines in each pixel. WO-A-9318419 describes a pixellated optical diffraction device in which each pixel is an individual optical diffraction grating where the pixels are arranged in groups containing a multiplicity of pixels according to a predetermined rule, typically mapping to larger pixels of an optically invariant image, in order to produce a visually observable optically variable effect. WO-A-9428444 describes a pixellated diffractive device including a multiplicity of pixels in turn divided into multiple sub pixel arranged in gridded arrays, where the sub pixels are arranged in groups to cooperate to generate a multiple image diffractive device upon illumination. It should be noted that all of the above techniques are limited to subdividing images into rectangular pixels that generally contain diffraction gratings of various types. WO-A-950498 details the structure of a surface relief diffractive device which generates multiple diffractive image components under illumination where the diffractive structure is divided into multiple discrete tracks. WO-A-9823979 describes the creation of a color diffractive device by again splitting an image into a gridded rectangular pixel array and further sub-dividing this array into component diffraction gratings whose relative areas are adjusted to control hue and intensity of color. WO-A-9917941 describes a pixellated diffusing device in which the diffuse elements are arranged in pixels and further arranged to have grey scale regions created by using structures of different scattering properties. A disadvantage of the 'Pixelgram' image pixel arrangements known from the above documents are the discontinuities that are evident between adjacent pixels, and in the Exelgram, the discontinuities between tracks. These inter-element gaps lead disadvantageously to diffuse scatter effects and extraneous diffraction effects. Additionally small pixels or tracks tend to increase scatter and reduce area fill efficiency and brightness. WO-A-002067 describes a diffractive device consisting of background diffractive elements and interstitial diffractive elements arranged such that the diffraction effect of the background elements is modulated by the interstitial elements. The teaching of all of the above documents is incorporated herein by reference.

Diffractive optical variable image forming devices are also known and have been produced by holographic methods, such devices are known for their use in security applications for example on credit cards, banknotes, etc. Examples of teachings on such holographically manufactured security structures can be found in U.S. Pat. Nos. 5,694,229, 5,483, 363 and WO-A-9959036. The optical recording and manufacturing methods and other teachings of these documents are incorporated by reference. Again these teachings are limited particularly in their flexibility and range of covert and microscopic features that maybe incorporated.

Some teachings also exist in relation to machine readable, or coherently viewable, holographic or diffractive structures as used for security. For example U.S. Pat. No. 4,544,266 reveals the authentication of a document by the use of a machine readable diffraction based encoded mark that is difficult to copy, and U.S. Pat. No. 5,101,184 describes another way of machine reading a diffractive security device by detecting the different intensities of diffracted light produced in different directions by asymmetric relief structures.

Another security device consists of a volume hologram and contains a visually viewable hologram combined with a superimposed laser transmission hologram as disclosed in DE-A-3840037, where the laser transmission hologram image is designed to be non-discernable under white light but designed to be read under coherent laser light using a visualiser or machine reader device.

U.S. Pat. No. 5,483,363 describes how an embossed surface relief hologram can contain a superimposed second diffractive structure designed to be machine readable by creating an out-of-plane image.

Another holographic system and method for determining which of a plurality of visually indistinguishable objects have been marked with a covert indicator is disclosed in U.S. Pat. No. 5,825,475 which reveals a number of usually indistinguishable objects some of which have been marked with a covert holographic indicator which is exposed to be viewed but which is detectable only when illuminated with a coherent reference light of predetermined wavelength designed to be evaluated by a specific form of scanner evaluation unit.

BRIEF SUMMARY OF THE INVENTION

Accordingly, the current invention seeks to provide an optical structure and method of producing the same having advantages over known such devices.

The present invention seeks to provide an optical diffraction structure having advantages over known such devices and also seeks to provide for an apparatus and method for producing such optical diffraction devices with advantages over other known apparatus and methods in the field.

The present invention describes a novel apparatus involving the use of electron beam lithography for writing diffractive structures in particular using a writing method where the size and shape of electron beam spot is entirely flexible and adjusted during the exposure to optimize the exposure time and parameters as appropriate.

The current invention also describes a novel data pre-processing methodology and software routines which enables optimization of the exposure area to an absolute level of resolution and which enables the creation of any graphical arrangement of grating or holographic structures without limitation. This is in contrast to the previous devices described which were essentially limited to pixel, line or track structures.

Advantageously, the combination of this data pre-processing methodology and a new flexible e-beam writing technique can be combined to form a new arrangement and system for the exact direct digital recording of any holographic or diffraction grating structure by electron beam writing of the pattern into, for example, silicon. Such an arrangement allows essentially a nearly unlimited flexibility with regard to the microstructure that can be recorded allowing an enormous range of optical structures to be recorded and combined together with a diverse range of characteristics (straight lines, continuous curved lines, geometrical shapes), and both diffraction grating. Fourier hologram and rainbow hologram patterns and optical element patterns can be recorded into one hologram.

Furthermore the resolution of graphical motifs achievable in accordance with the present invention equates to the resolution of the microstructure of the hologram itself and these patterns can be drawn continuously and without recourse to previous techniques which involve splitting graphic designs into line and pixel patterns to record difference effects.

Within the concept of the present invention there is complete flexibility to create, for example, an image displaying multiple switching diffractive images at different view angles or apparent movement or other effects either by creating regions of superposed microstructures that replay simultaneously the two or more different images or by sub dividing the design into any complex array of graphical elements (which may themselves contain additional information with their spacing, shape and arrangement) and sub-dividing the two diffractive channels between arrays of these arbitrary sub-elements, ideally according to a predetermined or statistical rule.

This new technique and the new class of optical devices so created are particularly suited for high security applications such as credit cards, banknotes, brand protection and the like because of the wide variation of available effects, the extremely high resolution allow the creation of very high resolution security features. This enables the creation of highly distinctive diffractive security images with a very high degree of resistance to counterfeit or reproduction by either conventional holographic or diffraction based generation techniques such as the technique known as dot matrix origination.

In the known art, data processing techniques for digitally driven origination, that is both for dot matrix systems and particularly for electron beam based systems as noted above, typically rely on software based on two level data input. The first level comprises graphics data such as bitmap date, for example, graphics design of hologram or diffractive structure which is converted to a graphics bitmap with a specially defined palette. Each pixel of graphic data represents either a diffraction grating with variable period and angle of lines) or any other custom pattern (circular grating, special graphics, multilevel structure, etc.). The interior pattern within a pixel or track, usually a diffractive structure but not limited to this, is defined on the second level of data input as shown in FIG. 1.

Pixel/track based systems have certain limitations from the software/writing approach which make some exposures ineffective, when considering the exposure time, and which cause exposed diffractive structures to generate additional optical noise.

Firstly, it should be appreciated that the whole diffractive structure is being pixelized. Both the graphic pixel structure and write beam spot size structure cause generation of optical noise. For example, noise will be generated at inter pixel gaps even within continuous areas of gratings because at the boundaries of pixels there is usually some blank area as in FIG. 2 which makes a very fine slit structure over the whole hologram area and for the microstructure transitions between microstructure lines between pixels may not be continuous for the phase conditions reducing the efficiency of the device. This problem occurs usually only when the hologram type of structure is exposed, because diffraction gratings are predefined in libraries of gratings with the most effective algorithm which does not fill the whole pixel area completely.

Secondly, the pixel structure of a diffractive device limits the graphic resolution of the diffractive or holographic image, since each pixel should contain at least about ten lines creating an elementary grating. This leads to approximately a 2000-3000 dpi limit in graphic resolution for pixel based devices. For example, the minimum height of holographic microtext may be 0.1 mm and in this case information about font shape will be lost. The pixel structure can sometimes also limit resolution in spatial spectra of diffraction gratings which fill pixels. In particular it is sometimes not possible to create an arbitrary angle of grating lines (considering pixel size) with optimized diffraction efficiency over a large area due to discontinuities between pixels. This limitation is shown in FIG. 3.

The present invention has advantages over prior techniques to overcome the above-mentioned limitations.

BRIEF DESCRIPTION OF THE DRAWINGS

This invention is described further hereinafter, by way of example only, with reference to the accompanying drawings in which:

FIG. 1 illustrates two-level data input for a dot matrix system.

FIG. 2 illustrates blank areas at the boundaries of pixels of a hologram or diffractive structure.

FIG. 3 illustrates pixel gratings with continuous and non-continuous lines.

FIG. 4 illustrates an electron beam spot produced according to an embodiment of the present invention;

FIG. 5 illustrates an area of microstructure;

FIGS. 6A-6C illustrates electron beam spot parameters as arising in an embodiment of the present invention;

FIGS. 7A-7E illustrate various exposure modes in the boarder regions of exposed areas according to embodiments of the present invention;

FIGS. 8A-8E illustrate the filing level of exposure near the said boarder regions;

FIGS. 9-11 illustrate the exposure of the structure with a tolerance related to electron beam spot size;

FIGS. 13 and 14 illustrate examples of sub area subdivision patterns of the diffractive structure images of FIGS. 12A and 12B;

FIGS. 15A and 15B illustrate diffractive devices according to further embodiments of the aspects of the present invention;

FIG. 16A illustrate another example of a device embodying the present invention;

FIGS. 16B and 16C illustrate examples of area subdivisions employed within the embodiments of FIG. 16A;

FIG. 18 illustrates the varying image offered by a device according to a further embodiment of an aspect of the present invention;

FIG. 20 illustrates examples of devices embodying the present invention and incorporating microscopic information structures;

FIG. 21A-21C illustrates embodiments of structures according to the authentification aspects of the present invention;

FIG. 22 illustrates a diffractive structure according to another embodiment of the present invention;

FIG. 23 illustrates a yet further arrangement of subdivisions according to an embodiment of the present invention; and FIG. 24A-24C illustrate an optical device embodying further aspects of the present invention.

DETAILED DESCRIPTION OF THE INVENTION

Figure 12A:
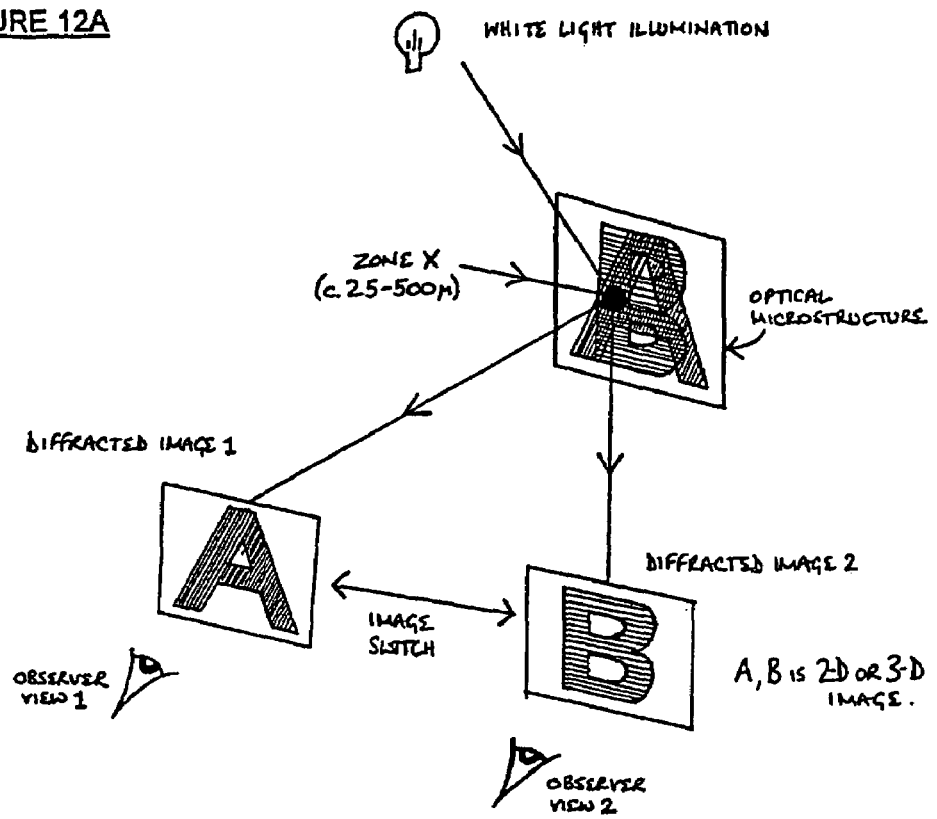
FIG. 12A illustrates an optical microstructure offering two diffractive images according to an aspect of the present invention.

Throughout the text, it should be appreciated that the process of forming an embossed hologram or embossed surface relief diffractive structure is broadly as known in the art (e.g. G. Saxby, "Practical Holography') after the lithographic exposure step. To form an embossed hologram the surface relief image exposed by the lithograph after development is formed in photo-resist—this is would be silvered to deposit a conductive layer, copied probably several times in a plating process as known in the field to form metal copies of the structure and then typically roll embossed into a plastic material or embossing lacquer or hot foil material using a thermo forming process, or cast into an ultra violet curable material and then metallised with typically aluminum or another reflective metal, perhaps chromium for example, to form an embossed hologram or embossed surface relief diffractive structure as known in the art. In an alternative process the surface relief diffractive structure can be coated with a transparent reflector such as typically titanium dioxide or zinc sulphide, as known in the art, to form a semi transparent surface relief diffractive structure replaying under illumination a visual image by the process of optical diffraction for example for use as a data protection overlay on a document. An alternative method of forming a data overlay is to use a demetallisation process to partially demetallise an aluminum reflector for example.

In one aspect of the present invention, e-beam lithography is employed and in particular the realization and actualization of an electron beam spot size and shape that is continuously variable during an exposure to optimise the structure and exposure time. A particularly advantageous arrangement incorporated into this invention specifically for the writing of optical and other microscopic non diffractive features is where the electron beam spot shape is rectangular as shown in FIG. 4 with variable size which can be changed during exposure independently in both cartesian coordinates. For example an advantageous system detained here is where the spot size can vary from 0.1 micron to 6 micron in both coordinates, the accuracy of the e-beam positioning is 0.1 micron, and sharpness in the corners of the spot 0.1 micron.

As an advantageous feature, the electron beam spot can be rotated by rotation of the beam about is longitudinal axis.

In another aspect of the present invention there is provided a new data pre-processing methodology which enables exposure optimization of arbitrary binary structures specified by bitmaps. So for example by analyzing a microscopic exposure pattern for a diffractive device the methodology can both optimize resolution and exposure time by adjusting electron beam spot size between spot exposures.

In one example, an exposure system employing a variable spot shape electron beam and exposure optimization methodology are combined to create a new and improved method for the direct writing of arbitrary diffractive or holographic structure specified by bitmaps.

Such a system can employ the following steps. The optimization technique uses a method of taking colored areas in the image specified by a black and white bitmap and dividing them into divided into elementary sub-areas, that is into e-beam exposure spots. The division of colored areas in the image is calculated by an optimization routine made considering the minimum number of sub-areas (exposure spots) necessary to expose the whole image by use of a variable exposure spot and then by submitting to different optional parameters.

Step 1. Typical input data for an arbitrary microstructure a black and white bitmap ("*.bmp" file type), where the white areas represent exposure area; or a greyscale bitmap, where the individual grey levels represent different exposure dosage.

Step 2. The first step is to define the Input parameters for the optimization process and exposure process in terms of:
  minimum and maximum e-beam spot size for optimization as shown in FIG. 6A.
  maximum ratio between sizes in both coordinates as shown in FIG. 6B.
Define and limit the allowable change in spot size for example to be only in multiples of minimum spot size as in FIG. 6C.

Step 3. The next step is to define the permitted exposure modes near the border of exposed area in terms of:
  The extent by which exposure spots cannot exceed the border of an exposed area (or only by a defined portion of the minimum exposure area of 0.1×0.1 micron) as illustrated in FIG. 7A.
  Or an allowable extent by which exposure spots can exceed the border area, typically by only up to one half of the minimum spot size as in FIG. 7B.
  Or exposure spots may exceed the border maximally to the area of the minimum spot size as in FIG. 7C.
  Or exposure spots may exceed the border maximally to 0.5 of the minimum spot area as in FIG. 7D.
  Or exposure spots may exceed the border maximally to the minimum spot area as in FIG. 7E.

The optimum and preferred edge exposure mode in this invention is the exposure mode of FIG. 7D where the exposure spots may exceed the border maximally to 0.5 the minimum spot area. However, it should be appreciated that all modes are possible within the scope of this invention.

Step 4. The next step is to define the filling level of exposure near the border which can be one of several types as illustrated in FIGS. 8A to 8E.
  maximum filling is illustrated in FIG. 8A to 8E.
  incompleteness of filling on the surrounding area of the spot (in each of four directions) may reach the minimum spot area as in FIGS. 8B-8E.

The optimum and preferred mode of filling level of exposure near the border in this invention is the exposure mode A where the exposure area is maximally filled. However, all mode are possible within the scope of this invention.

Step 5. The final input parameter is the optimized filling of the exposure area with exposure spot having an optional exposure dosage (exposure time), which can be assigned by external data.

The output of the above methodology yields three aspects. Firstly, a bitmap representing the final exposure area. Secondly a set of data file as an input into exposure simulation software and thirdly a set of data files as an input exposure control system of e-beam lithograph.

Step 6. An optional intermediate step further involves optionally running the set of data files in an exposure simulation software program to check for run time and run integrity.

Step 7. In the final writing step the methodology then involves using these data files to write an arbitrary diffractive microstructure using these data files as the input exposure control to an electron beam lithograph. During the exposure the lithograph and the data files will control exposure time per spot (viz dosage), spot area which will change continuously between successive exposures as required to optimize the exposure time, fidelity to the required pattern and fill factors and spot position for each successive stepwise exposure which will determine the form of the microstruction written.

After exposure typically into an electron beam sensitive photoresist the resist will be developed by a process known in the art by an etching process to give a surface relief optical microstructure in the resist layer. This structure can be metallised and then used in a plating process to forms replica suitable for mass replication by roll embossing, molding or flat bed embossing.

The advantage of this technique is that an arbitrarily shaped are of area can be accurately filled with any arbitrary microstructure. The technique allows for complete flexibility but also complete optimization of the process whilst at the same time retaining an optimized exposure time because the exposure resolution is retained maximally where required and also the electron beam spot size can be increased where allowable to allow for more rapid exposures. This technique will create any holographic or diffractive structure provided the structure required can be computer calculated and expressed as a bitmap and will also create a wide range of nano-technology structures such micro facets, micro optics, micro-mechanical structures or micro detectors very accurately and flexibility.

In a second aspect of a method embodying the present invention the combination of exposure system by variable spot shape electron beam and another exposure optimization methodology are combined to create a new and improved method for the filling of an arbitrary area with sub micrometer structures. This enables the filling of very high resolution sub areas of a security design with sub micrometer structures taken for example from a data library.

This aspect of the invention uses a methodology described by software description for filling exactly a graphic area to the highest possible resolution obtainable (i.e. to the size of the e-beam spot) with a sub-micrometer structure such as a diffraction grating, holographic structure, diffractive structure or nano-structure whose form is pre-determined by a data file contained in a data library. Typically the methodology would create a security optical microstructure by combining a graphics file defining the image to be found, a descriptor of each graphical area in terms of a greyscale or RGB scale and a data library containing various pre-calculated sub-micrometer optical or holographic microstructures which are assigned to infill specific area according to a mapping of a greyscale or RBG palette from the master graphical file to the data library. This allows an optical microstructure consisting of many areas of other optical microstructures to be created from a wide ranging data library of structures. An important part of this methodology is the way in which the microstructures are tailored to permit exact high resolution filling of an arbitrary area defined by bitmap or vector curve by a custom sub-micrometer structure whilst retaining a reasonable write time for the entire structure. This method overcomes the previous limitations on graphics resolution and form of graphics (pixels, tracks) used by other systems by allowing arbitrary graphical regions of high resolution limited only by the spot size of the recording system to be exposed.

The methodology of this aspect comprises the following:

Step 1: The input graphics are assembled as one of a number of possible digital graphical file formats using one of a number of standard formats or programs. Colors in the image represent a specific area filling as defined either by the user defining a specific area filling or by a user or job specific algorithm dictated a mapping function to the optical microstructure data library for the generation of various specific predetermined elementary optical microstructure motifs or patterns for filing the are defined by a particular color or greyscale.

Step 2: The methodology of filling the structure, the methodology being defined such that the structure cannot exceed the border. The guiding rule methodologies that can be used for this in this system are as follows:

Exact—the structure is exposed up to the border with an accuracy of the minimum e-beam spot size typically 0.1 micron—as shown in FIG. 9.

With tolerance of minimum spot size used as shown in FIG. 10.

With tolerance of one exposure spot—the structure is exposed up to the border with tolerance of the exposure spot exceeding the border—as shown in FIG. 11.

The optimum fill pattern used depending on job requirement would be the first option where the structure is exposed to form graphics of the highest possible resolution.

The output these Steps 1 and 2 comprises a data file used to run an exposure simulation software and also as a data file to the exposure control system of the lithograph. The colors RGB or greyscale of the graphics file map to specific microstructures in the data file via an assignment which can be operator defined. Known as the exposure palette—typically up to 5000 assignments are possible with this system.

Step 6. An optional intermediate step further involves optionally running the set of data files in an exposure simulation software program to check for run time and run integrity.

Step 7. In the final writing step the methodology then involves using these data files to write an arbitrary resolution area of a set of optical microstructure defined by a data library diffractive microstructure using these data files as the input exposure control to an electron beam lithograph. During the exposure the lithograph and the data files will control exposure time per spot (viz dosage), spot area which will change continuously between successive exposure as required to optimize the exposure time, fidelity to the required pattern and fill factors and spot position for each successive stepwise exposure which will determine the form of the microstructure written.

During the exposure the electron beam spot size and shape that is continuously variable during an exposure to optimise the structure and exposure time. A particularly advantageous arrangement incorporated into this invention specifically for the writing of optical and other microscopic non diffractive features is where the electron beam spot shape is rectangular a shown in FIG. 4 with variable size which can be changed during exposure independently in both cartesian coordinates.

For example an advantageous system detailed here is where the spot size can vary from 0.1 micron to 6 micron in both coordinates, the accuracy of the e-beam positioning is 0.1 micron, and sharpness in the corners of the spot 0.1 micron.

After exposure typically into an electron beam sensitive photo-resist the resist will be developed by a process known in the art by an etching process to give a surface relief optical micro-structure in the resist layer. This structure can be metallised and then used in a plating process to forms replica suitable for mass replication by roll embossing, moulding or flat bed embossing.

By means of the above methods, or a combination thereof, an optical microstructure, or any nano technology scale structure, can be produced by either using the first method to fill an arbitrary area with an arbitrary sub-micrometer structure, or by using the second method to fill any arbitrary area of a resolution up to the resolution of the e-beam spot with any one of a number of predetermined microstructures held in a data library and described by an exposure palette linking the graphic design file to the data library. The exposure methodology used throughout this is electron beam of variable and definable spot size. These methodologies allow the exposure of highest possible resolution structure in reasonable times on an electron beam system by tailoring spot size to exposure optimize both resolution of graphic and minimize exposure time during run. These methodologies allow areas of optical microstructure or nano-structures with the ultimate highest resolution graphics to be recorded using electron beam lithography in an efficient way. This overcomes the limitations of previous systems to pixels, tracks or other such field structures.

The invention also provides for novel diffractive optical device feature that can, in particular, arise from the above-mentioned methods and systems.

Figure 12B:
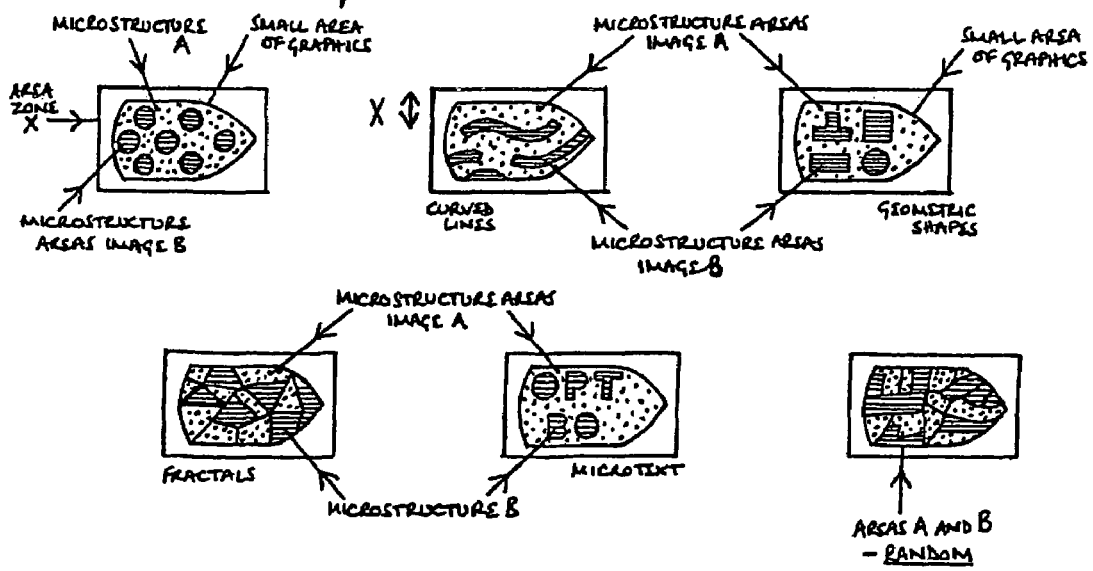
FIG. 12B illustrates possible structures for a zone of the microstructure of FIG. 12A.

A diffractive optical security device producing two or more defined graphical images visible to an observer from different observations directions around the device when the device is illuminated by white light producing a defined image switch and change between two or more visually distinct graphical two dimensional or three dimensional views illustrated in FIG. 12A. This device is characterized in that the microstructure corresponding to each graphical view in any small area is contained in a defined discrete small area, characterized that the graphical areas containing the microstructures are of a flexible graphical shape. For example, and as illustrated in FIG. 12B, one diffractive view channel of an image could be in the shape of small dots, lines, figures or micrographics reversed out of another diffractive viewing channel, characterized such that the size of the structures would be smaller than the normal resolution of a human observer and therefore non visible and non degrading to the graphical patterns seen by an observer. A useful and preferred example is where the sub division areas corresponding to the various channels are split between defined graphical areas corresponding to different diffracted views using graphical shapes of various substantially different sizes and shapes generated by a shape generating and an area splitting rule. So these patterns in one preferred embodiment are split not into uniform pixels various and perhaps varying shapes. A useful preferred embodiment of this is where the rule for area division is governed to generate a pseudo random pattern whose shape and area is governed by fractal geometry, where the areas appear random in shape and size but have a discernable statistical profile. A particularly preferred embodiment would be where the fractal pattern has been generated according to a particular rule carrying particular characteristic information which can be decoded by analyzing the pattern by the use of fractal techniques. One such fractal type encoding is used in the a technique known as 'Microbar' for the protection of data by the incorporation of hidden data encoded and encrypted within the fractal pattern but decodable using the correct algorithm by analysis of the pattern. So the switching image becomes no longer pixellated but split by a rule governing the size and shape of areas corresponding to different microstructures which in one embodiment can vary and which in another embodiment of this can be used to carry an additional code or signature that can be made characteristic of the form of origination or the application for example.

A further useful (not limiting) embodiment of this device is where the sub areas are subdivided by a rule, complex or simple, generating the shape and parameters of the sub areas and also the relative area split of the sub areas in order to provide the desired relative brightness of the various diffractive view channels of the device.

A useful embodiment is where the graphical subdivisions between channels are in the form of curved lines, elongated in one direction but of a size in another direction to stay below the limit threshold of human vision (10 to 75 micron) typically such that the length of the feature will be between 2 and 10 times its width. Usefully a curved lien structure also optionally with irregular aspects reduces noise from any periodic effects in the substructure seen in earlier techniques (such as regular pixel patterns or tracks). Usefully the curved lines or other geometrical shapes will be of varying size in on direction (e.g. varying length).

Useful embodiments of the above method for subdividing a diffractive structure will be for a diffractive image to produce a switching effect where the diffractive structures when subdivided have a much higher diffraction efficiency than the multiple diffractive structures when superimposed on one another where the diffractive efficiency is lower.

A useful device is where the device consists of areas of diffractive structure with the same spatial frequency but different grating profiles arranged such that the areas have different diffractive efficiencies in different grating orders (+1 and −1) such the optical device replays an image visualised by an observer by contracts reversal on rotating the device through 180 degrees in its own plane due to the change in diffraction efficiency between the two non symmetrical grating structures.

Turning now to FIG. 13, there is illustrated an optical microstructure producing under illumination a or more defined graphical images generated by a process of diffraction and visible to an observer from different angles around the device, characterized such that the sub area is split into discrete sub areas of a size not discernable to an observer, (typically 10 to 75 micron), each collection of sub areas containing the diffractive or sub micron microstructure applicable to one viewable diffracted image, the graphical areas of sub-division being variable and consisting of dots taken out of a full area, lines or elongated dots or short lines taken out of a full area, curved linear tracks, wavy line patterns.

A further useful embodiment of a device, such as that in FIG. 12 A is where the sub areas are sub divided by a rule, complex or simple, generating the shape and parameters of the sub areas and also the relative area split of the sub areas in order to provide the desired relative brightness of the various diffractive view channels of the device.

A useful embodiment is where the graphical sub divisions between channels are in the form of curved lines, elongated in one direction but of a size in another direction to stay below the limit threshold of human vision (10 to 75 micron) typically such that the length of the feature will be between 2 and 10 times its width. This is shown in FIG. 14. This formation of sub areas is useful to allow a useful area of diffractive structure to gain useful level of efficiency and to reduce the number of boundaries and yet also to keep one dimension of the structure small enough to prevent degradation of the graphical diffracted image by the sub structure. Usefully a curved line structure also optionally with irregular aspects reduces noise from any periodic effects in the sub structure seen in earlier techniques (such as regular pixel patterns or tracks). Usefully the curved lines or other geometrical shapes will be of varying size in one direction (e.g. varying length) in order to reduce summation effects and eliminate up any overall pattern effect that may e visible to an observer.

Useful embodiments of the above method for sub dividing a diffractive structure will be for an diffractive image to produce a switching effect where the diffractive structures when sub divided have a much higher diffraction efficiency than the multiple diffractive structures when superimposed on one another where the diffractive efficiency is lower.

A diffractive Optical Device as noted can be arranged to incorporate an optical switching image where the elemental diffractive structures comprise diffraction gratings modeled to give the diffractive replay effects of short rainbow hologram slits. These can also contain elements that are Fourier holograms producing images focused far from the image plane of the device to be read under laser illumination. Such an arrangement is illustrated in FIGS. 15A and 15B.

Figure 16C:
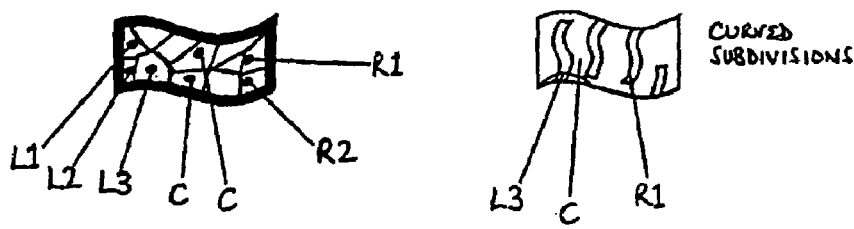

In FIGS. 16A to 16C, there is illustrated a diffractive microstructure producing a 3D depth effect (e.g. a 2D/3D effect by the appearance of depth and parallax) or a true three-dimensional effect or an effect similar to stereogram techniques for producing 3D images of real subjects. The effect is generated by sub dividing the diffractive structure into many small sub areas, typically 10 or 15 or more for a 3D effect or stereogram effect, and using each small sub areas or assembly of sub areas to replay a particular view parallax of the object directed into the observers eye. A useful method of area sub divisions to conceal the small graphical sub divisions is to use a sub division rule of different shapes or geometries—here this is a similar technique in this aspect to the optical devices of FIGS. 12 and 13.

Figure 17A:
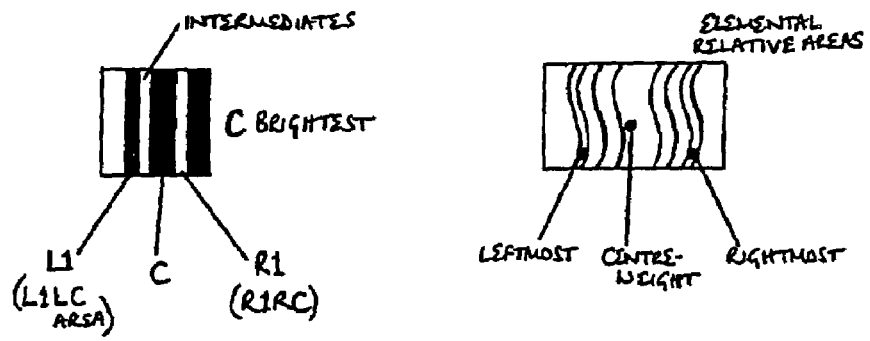
FIG. 17A illustrate examples of parallax-compensating areas of subdivision.
Figure 17B:
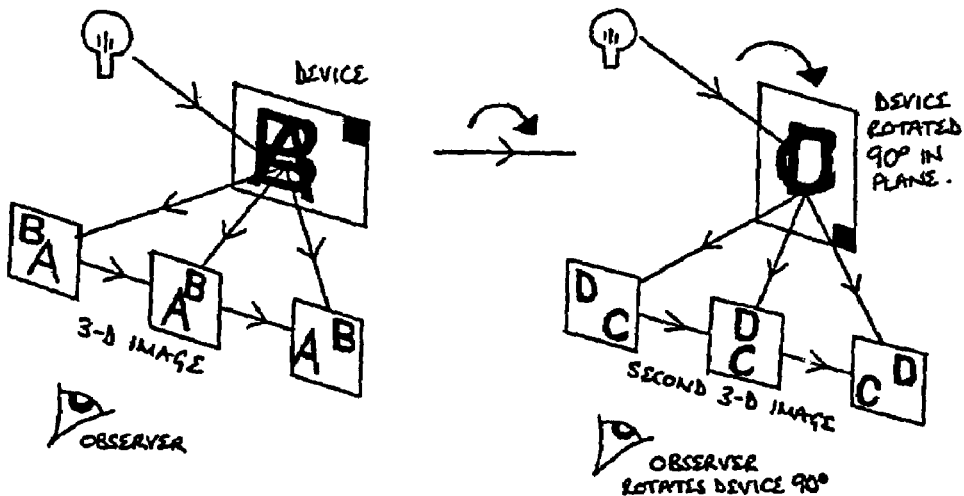
FIG. 17B illustrates an example of a device employing the subdivisions of FIG. 17A.

A useful sub division methodology is where the microstructure is split into curved lines, as in device 2, or vertically orientated lines and this is shown in FIGS. 17A and 17B. Another useful embodiment is where the area of each elemental line (e.g. for the 1st and 2nd leftmost views and say the 14th and 15th right most views of an object) are adjusted in area to adjust the brightness of the corresponding diffractive channels to relative to the centre parallax channels—for example to give good clarity but sub due depth effects by reducing these channel efficiencies or to give an enhanced depth and parallax effect by enhancing these channel efficiencies.

A particularly useful aspect of this illustrated embodiment is the use of the technique to generate an optical diffraction image that replays under illumination a three dimensional image in one view and also replays a second three dimensional image visible on rotating the device through 90 degrees in its plane.

Turning now to FIG. 18, there is illustrated an optical device mirroring aspects of the devices described above and wherein the diffractive areas of the device have replay characteristics that, when illuminated and rotated in a plane, an observer sees an apparent motion effect of movement and/or shape changes. Such effects are useful for security and would incorporate apparent motion of an object, morphing of an object between various states through a sequence of views, expansions, linear motions, etc. A useful attribute is where the elemental diffractive areas are border and operate together in element shapes as in the device of FIG. 12 and particularly where these shapes fulfill an additional purpose of authentication.

Two particularly useful effects are where the elemental area have an apparently random though characteristic pattern generated typically as a fractal pattern of areas and where the patterning can contain additional encrypted information adding to the security and to verify the authenticity of the device. Also we claim a method of verification whereby the diffractive device is scanned and the pattern of the area distribution structures decoded to provide additional characteristic information pertaining to the hologram.

Figure 19A:
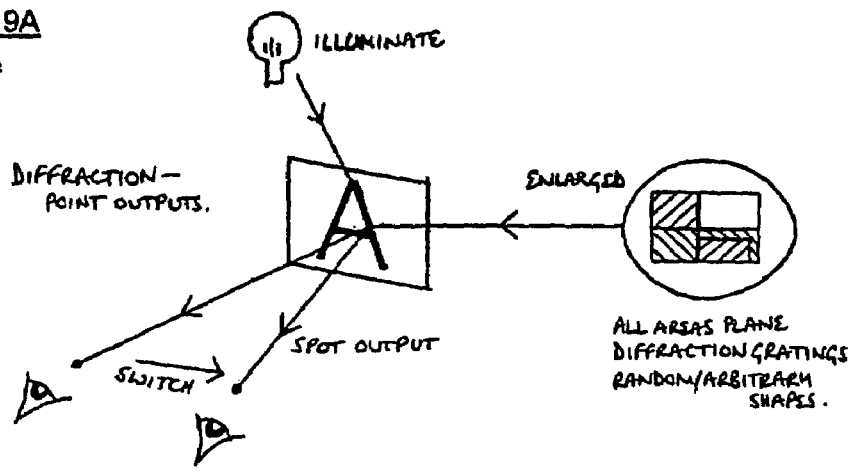
FIGS. 19A-19C illustrates examples of devices according to further embodiments of the present invention.

The device illustrated with regards to FIG. 19A relate to any of the aforementioned devices in which sub area diffractive structures are filled by plane diffraction grating structures.

Figure 19B:
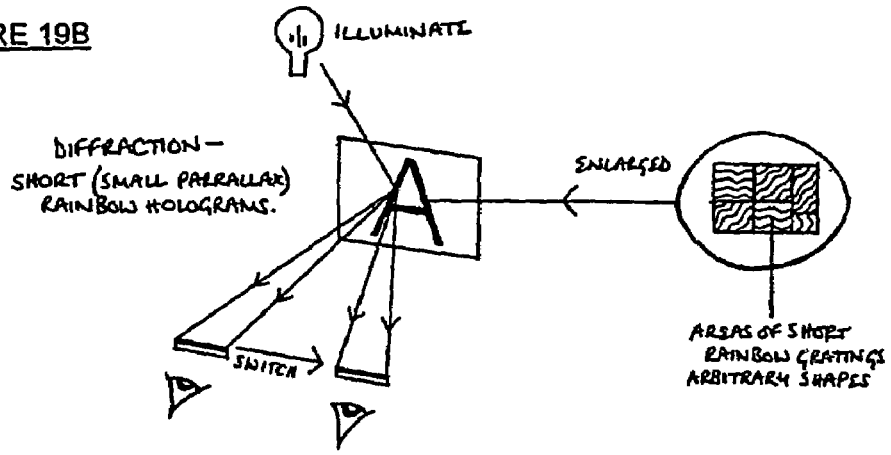

The device of FIG. 19B arises from the sub area structures of the said aforementioned devices being filled with alternative pre-calculated sub micron diffractive structures. Particularly useful structures comprise diffractive structures whose replay is limited in parallax in the one direction and slightly extended in parallax in another direction (a similar replay to a short element of a rainbow hologram) to give a useful degree of additional view angle in a direction parallel to the horizontal axis of the device. A useful switching device is made up of an assembly of such structures providing usefully different view characteristics to those of a standard diffraction grating device.

Figure 19C:
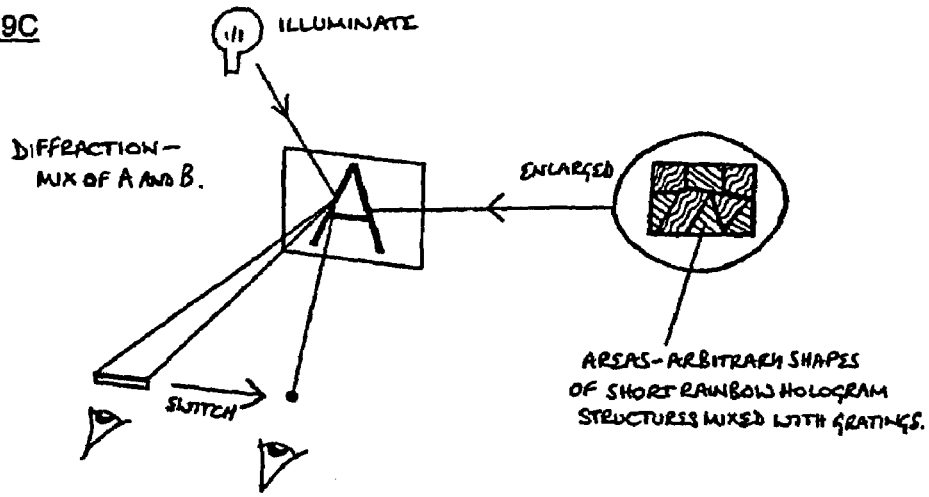

Turning now to FIG. 19C, there is illustrated an optical device in which one or more components of the elemental diffractive structures consist of diffractive devices reconstructing a diffracted image similar to that of a rainbow hologram, whilst other components of the elemental structures consist of diffraction grating structures.

A method of incorporating, in the devices of FIGS. 12 and 13, a microscopic information structure containing graphical information of size 250 micron to 2 micron illustrated by FIG. 20. Such information would be either occupying a discrete set of zones, for example by writing into the device of FIG. 12 a set of zones defining one component diffractive image, and in the device of FIG. 13 a structure that also contains within its fill structure microscopic graphic information. This graphical information would be visible only with magnification aids—microscope, etc.

A useful example of this is where the microscopic security graphics is arranged in shapes enclosing and modulating a diffractive area—a useful form of diffractive area would be an area replaying under illumination a rainbow holographic type structure—this has advantages in that incorporating microscopic information into this type of structure is extremely difficult both using conventional laser interferometry techniques (as the image will be degraded and destroyed by focus errors and speckle) and also by using dot matrix or mechanical recombination techniques (which are useful for recording areas of plane diffraction gratings). A useful text size would be 10 micron to 200 micron.

Another useful aspect of this invention is where the microtext and micro-graphics are very small (size 1. to 10 micron) and are incorporated within the diffractive or holographic sub-micron diffractive structure within the diffractive line structure—one example of a suitable diffractive structure would be a diffraction grating but another a particularly useful example would again be where the diffractive structure corresponds to that of a rainbow hologram, or open aperture hologram or a diffractive element reconstructing a laser viewable out of plane image where the structure would be very difficult to produce with other techniques.

A useful alternative embodiment that would be incorporated with Optical devices 1 and 2 would be where one of the sub division graphic shapes used for one or several of the sub division areas would be in the shape of micro writing or microtext.

As with the device of FIG. 20, and further illustrated in FIG. 21, where many identical images of micro images or micro graphics are arranged in a regularly spaced two dimensional array within the sub structure of the diffractive device—typically each micro-image will be of a size where the details cannot be resolved by the unaided human eye—typical size range 200 micron to 10 micron. Elemental details on such micro images will be down to say 1 micron. A particularly useful form of micro image is where the micro image is reversed dark out of a diffractive area, typically a diffraction grating or holographic like diffractive area. Another useful embodiment is where the diffractive area is an achromatic replay diffractive element or is diffusing non-holographic structure. In these examples the micro images would be reversed out of the microstructure.

A preferred and useful method of authenticating such a structure is to use an array of small lenslets, known as micro-lenses whose pitch is matched to the regular array of the micro-images and whose focal point is on the plane of the device. In this case when the micro lens array is overlaid on top of the diffractive device the micro lenses and micro images cooperate via a moiré type effect to generate a magnified image or images of the micro image—in the case of perfect alignment one single enlarged image will be seen whilst in the case of some angular mis-alignment a number of smaller images will be seen whose size, orientation and position is determined by the moiré beat effect between the micro image array and lens array as successive areas produce in and out of phase images.

This device would also be useful if the elemental areas of micro images were created out of areas of diffractive structure such as plane diffraction gratings or rainbow or Fourier type diffractive devices. A useful authentication device is the use of a diffractive lens (a Fresnel zone plate) rather than a micro lens structure as shown in FIG. 20B—typically this would have the advantage of being manufacturable by roll embossing.

Figure 21B:
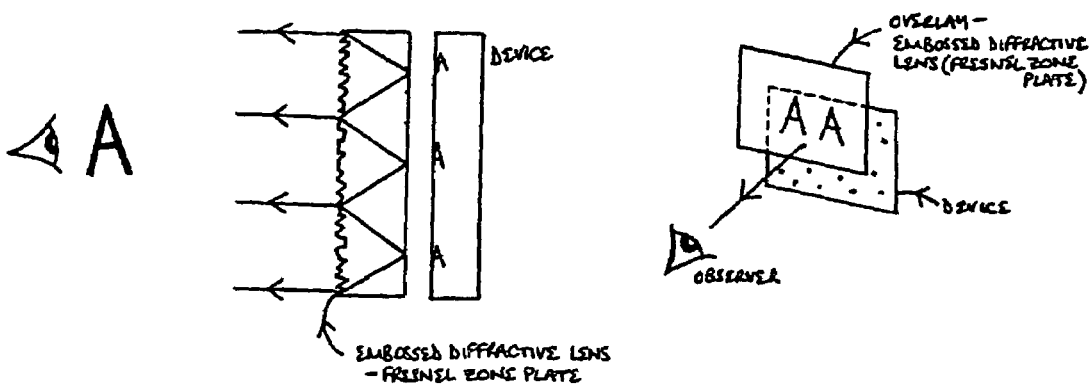
Figure 21C:
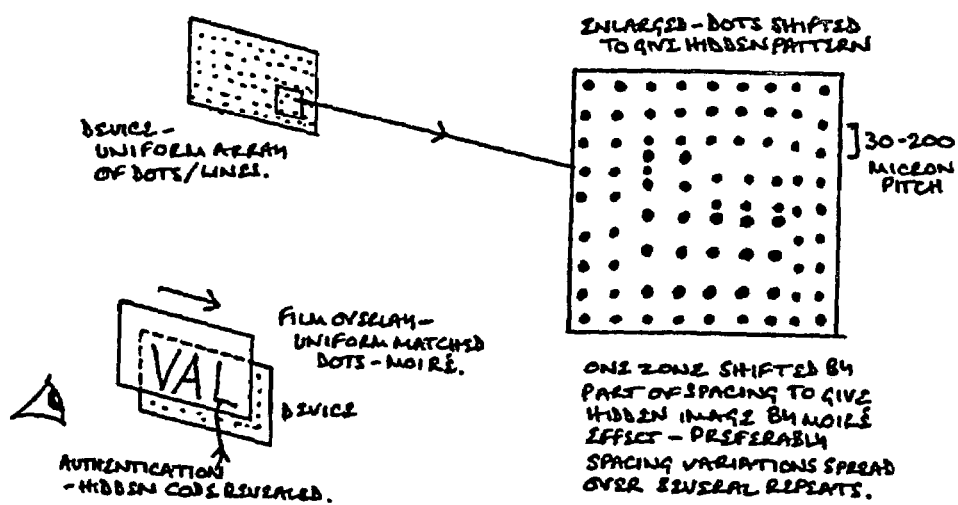

Another particularly useful embodiment of the hologram is where the basic microstructure is ordered with a secondary pattern on the 50 micron to 170 micron scale which appears to be uniform—as in FIGS. 21A to 21C—such as a pattern of pixels, dots or lines. However, the positions of individual elements are subtly moved from a regular array position by a small imperceptible amount. This additional patterning is designed to be undetectable to the eye and generally undetectable under close examination. However, the patterning is designed to be decoded by a matched film overlay reader containing a matched but regular pattern. When overlaid and viewed in cooperation with the decoder film the two patterns cooperate to generate moiré fringes—the displaced elements and the hidden code therein can then be seen clearly by an observer as an interruption and displacement within the moiré fringes. This pattern relies upon the spatial frequency of the microscopic pattern within the diffractive structure and the spatial; frequency of the dot or line pattern in the decoder being the same or closely matched. Usually the contrast of the decoded image will be optimized by using a reverse or contrast enhancing film decoder.

The method of optical microstructure manufacture detailed above, and with regard to the device examples of FIGS. 12 and 13 can also be expanded to form a non pixel based/non track method of grey scaling as shown in FIG. 22—various of the arbitrarily shaped diffractive features would contain a non diffractive scattering structure designed to scatter incident light to form a print type effect. Using methods for forming the devices of FIGS. 12 and 13, these non-diffractive scattering structures could form one component of the sub divisions of the optical device. This could be used to provide a scattering permanent image replaying with the diffractive structure or to form areas composed of white scattering features. A grey scale image could be produced by modulating the areas of the elemental scattering features to alter the fill factor by elemental area of scatterer to produce grey scale tones. Arbitrary micrographics could be incorporated by altering either the shape of the elemental areas to form graphical effects or incorporating graphical images into the structure sub micron diffusing structure.

The methods as employed for forming any of the devices above, where a rule of graphics arrangement in the artwork on a small scale (500 micron to 1 micron) is arranged in a pattern whose arrangement carries encoded information, typically arranged according to fractals, and having a so called Digital Watermark encoded therein as illustrated in FIG. 23.

Finally, with regard to FIG. 24, there is illustrated a device wherein certain areas of the device the diffractive structures are holographic optical elements generating lens and focusing effects and which can be incorporated into any of the above-mentioned devices. Advantageous embodiments would comprise areas of multiple lenses all forming focused images at particular direction and distance from the device and in a particularly advantageous embodiment this can form an encoded message.

It should be appreciated that the invention is not restricted to the details of any of the foregoing embodiments.

The invention claimed is:

1. A diffractive optical device produced by exposing arbitrary binary structures specified by bitmaps and filling a graphic area of the device with a sub-micrometer structure in a form pre-determined by a data file retrieved from a data library.

2. The diffractive optical device of claim 1, further produced by analyzing a microscopic exposure pattern for the diffractive device.

3. The diffractive optical device of claim 1, further produced by combining a graphics file defining an image to be found, a descriptor of each graphical area, and a data library containing the predetermined sub-micrometer structures.

4. The diffractive optical device of claim 3, further produced by determining colored areas in an image specified by means of a black and white bitmap and dividing the areas into elementary sub-areas corresponding to electron beam exposure spots.

5. The diffractive optical device of claim 4, further produced by incorporating the black and white bitmap in a manner wherein the white areas are arranged to represent an exposure area.

6. The diffractive optical device of claim 4, further produced by defining input parameters on the basis of minimum or maximum electron beam spot size and the maximum ratio between different dimensions of the electron beam spot.

7. The diffractive optical device of claim 4, further produced by defining a permitted exposure mode adjacent a border of an exposed area on the basis of the relationship between the electron beam exposure spot and the border area.

8. The diffractive optical device of claim 7, further produced by controlling the relationship such that the electron beam exposure spots do not exceed the boarder by more than 0.5 of the minimum electron beam spot area.

9. The diffractive optical device of claim 4, further produced by defining a filling level of exposure adjacent the border.

10. The diffractive optical device of claim 5, further produced by determining an optimized filling of the exposure area when the electron beam exposure spot is arranged to provide an exposure time determined by external data.

11. The diffractive optical device of claim 4, further produced by running a set of data files in an exposure simulation software program serving to check for run time and run integrity.

12. The diffractive optical device of claim 11, further produced by employing the data files to write an arbitrary diffractive microstructure by employing the data files as an input exposure control to an electron beam lithograph.

13. The diffractive optical device of claim 1, further produced by assembling input graphics as one of a plurality of possible digital graphical file formats, defining a specific area filling as at least one of the colors in the image for the generation of specific predetermined elementary optical microstructure.

14. The diffractive optical device of claim 13, further produced by preventing the structure from exceeding a defining border and on the basis of tolerance defined by minimum electron beams spot size.

15. The diffractive optical device of claim 13, further produced by running a set of data files in an exposure simulation software program in order to determine run time and run integrity.

16. The diffractive optical device of claim 13, further produced by writing an arbitrary resolution area of a set of optical microstructures defined by the said data library and by means of the said data files serving as input exposure control to an electron beam lithograph.

* * * * *